US012198733B2

(12) United States Patent
Yoshida et al.

(10) Patent No.: US 12,198,733 B2
(45) Date of Patent: *Jan. 14, 2025

(54) EDITING METHOD AND RECORDING AND REPRODUCING DEVICE

(71) Applicant: Maxell, Ltd., Kyoto (JP)

(72) Inventors: Susumu Yoshida, Kawasaki (JP); Junji Shiokawa, Chigasaki (JP); Hiroo Okamoto, Yokohama (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/436,447

(22) Filed: Feb. 8, 2024

(65) Prior Publication Data

US 2024/0177742 A1    May 30, 2024

Related U.S. Application Data

(63) Continuation of application No. 18/244,514, filed on Sep. 11, 2023, now Pat. No. 11,929,101, which is a
(Continued)

(30) Foreign Application Priority Data

Dec. 2, 2004 (JP) .................. 2004-349264
Dec. 28, 2004 (JP) .................. 2004-378767
Dec. 28, 2004 (JP) .................. 2004-378768

(51) Int. Cl.
*H04N 9/80*      (2006.01)
*G06F 3/0482*    (2013.01)
(Continued)

(52) U.S. Cl.
CPC .......... *G11B 27/102* (2013.01); *G06F 3/0482* (2013.01); *G11B 27/031* (2013.01);
(Continued)

(58) Field of Classification Search
CPC ... H04N 9/80; H04N 5/93; H04N 5/92; G11B 27/00
(Continued)

(56) References Cited

U.S. PATENT DOCUMENTS

| 4,086,619 A | 4/1978 | Miyake et al. |
| RE32,632 E | 3/1988 | Atkinson |

(Continued)

FOREIGN PATENT DOCUMENTS

| CA | 2 321 522 A1 | 9/1999 |
| CN | 1243596 A | 2/2000 |

(Continued)

OTHER PUBLICATIONS

WinTV Installation and Reference Manual, Jun. 30, 1999.
(Continued)

*Primary Examiner* — Daquan Zhao
(74) *Attorney, Agent, or Firm* — MATTINGLY & MALUR, PC

(57) ABSTRACT

In order to provide a recording and reproducing device that allows a user to select and manage arbitrary play lists, a unit of management for managing all registered play list information and an upper management hierarchical level are added. The unit of management is adapted to be handled on the same level with unified information that indicates a reproduction range of all AV data. User-defined unified information is adapted to be handled on the added management hierarchical level. The user-defined unified information is formed to allow arbitrary reproduction ranges contained on a lower hierarchical level to be registered.

28 Claims, 9 Drawing Sheets

Related U.S. Application Data continuation of application No. 17/961,183, filed on Oct. 6, 2022, now Pat. No. 11,783,863, which is a continuation of application No. 17/242,565, filed on Apr. 28, 2021, now Pat. No. 11,468,916, which is a continuation of application No. 16/883,124, filed on May 26, 2020, now Pat. No. 11,017,815, which is a continuation of application No. 16/221,908, filed on Dec. 17, 2018, now Pat. No. 10,679,674, which is a continuation of application No. 15/808,175, filed on Nov. 9, 2017, now Pat. No. 10,199,072, which is a continuation of application No. 15/176,435, filed on Jun. 8, 2016, now Pat. No. 9,818,449, which is a continuation of application No. 14/141,417, filed on Dec. 26, 2013, now Pat. No. 9,384,783, which is a continuation of application No. 12/567,898, filed on Sep. 28, 2009, now Pat. No. 8,644,684, which is a continuation of application No. 11/203,457, filed on Aug. 11, 2005, now Pat. No. 7,613,383.

(51) Int. Cl.
| | |
|---|---|
| *G11B 27/00* | (2006.01) |
| *G11B 27/031* | (2006.01) |
| *G11B 27/034* | (2006.01) |
| *G11B 27/10* | (2006.01) |
| *G11B 27/34* | (2006.01) |
| *H04N 5/76* | (2006.01) |
| *H04N 9/87* | (2006.01) |
| *H04N 5/92* | (2006.01) |
| *H04N 5/93* | (2006.01) |
| *H04N 9/82* | (2006.01) |

(52) U.S. Cl.
CPC ............ *G11B 27/034* (2013.01); *G11B 27/34* (2013.01); *H04N 5/76* (2013.01); *H04N 9/87* (2013.01); *G11B 2220/2562* (2013.01); *H04N 9/8205* (2013.01)

(58) Field of Classification Search
USPC ....... 386/239, 240, 278, 280, 281, 282, 326, 386/353
See application file for complete search history.

(56) References Cited

U.S. PATENT DOCUMENTS

| | | |
|---|---|---|
| 4,970,663 A | 11/1990 | Bedell et al. |
| 5,442,744 A | 8/1995 | Piech et al. |
| 5,616,876 A | 4/1997 | Cluts |
| 5,654,746 A | 8/1997 | McMullan, Jr. et al. |
| 5,704,051 A | 12/1997 | Lane et al. |
| 5,715,403 A | 2/1998 | Stefik |
| 5,734,823 A | 3/1998 | Saigh et al. |
| 5,751,282 A | 5/1998 | Girard et al. |
| 5,758,068 A | 5/1998 | Brandt et al. |
| 5,767,897 A | 6/1998 | Howell |
| 5,805,762 A | 9/1998 | Boyce |
| 5,844,056 A | 12/1998 | Kennedy |
| 5,862,299 A | 1/1999 | Lee |
| 5,870,754 A | 2/1999 | Dimitrova et al. |
| 5,884,056 A | 3/1999 | Steele |
| 5,911,129 A | 6/1999 | Towell |
| 5,930,446 A | 7/1999 | Kanda |
| 5,974,219 A | 10/1999 | Fujita et al. |
| 6,005,579 A | 12/1999 | Sugiyama et al. |
| 6,020,930 A | 2/2000 | Legrand |
| 6,023,520 A | 2/2000 | Nagasaka et al. |
| 6,157,744 A | 12/2000 | Nagasaka et al. |
| 6,166,735 A | 12/2000 | Dom |
| 6,175,362 B1 | 1/2001 | Harms et al. |
| 6,181,870 B1 | 1/2001 | Okada et al. |
| 6,182,069 B1 | 1/2001 | Niblack et al. |
| 6,219,837 B1 | 4/2001 | Yeo et al. |
| 6,233,389 B1 | 5/2001 | Barton |
| 6,236,395 B1 | 5/2001 | Sezan |
| 6,236,971 B1 | 5/2001 | Stefik et al. |
| 6,243,725 B1 | 6/2001 | Hempleman et al. |
| 6,259,418 B1 | 7/2001 | Jones et al. |
| 6,289,165 B1 | 9/2001 | Abecassis |
| 6,301,586 B1 | 10/2001 | Yang et al. |
| 6,353,702 B1 | 3/2002 | Ando |
| 6,389,467 B1 | 5/2002 | Eyal |
| 6,400,378 B1 | 6/2002 | Snook |
| 6,400,893 B1 | 6/2002 | Murase |
| 6,408,301 B1 | 6/2002 | Patton et al. |
| 6,452,609 B1 | 9/2002 | Katinsky et al. |
| 6,456,334 B1 | 9/2002 | Duhault |
| 6,470,140 B1 | 10/2002 | Sugimoto et al. |
| 6,480,669 B1 | 11/2002 | Tsugumagari et al. |
| 6,493,006 B1 | 12/2002 | Gourdol |
| 6,539,545 B1 | 3/2003 | Dureau |
| 6,609,253 B1 | 8/2003 | Swix |
| 6,611,813 B1 | 8/2003 | Bratton |
| 6,646,655 B1 | 11/2003 | Brandt et al. |
| 6,704,028 B2 | 3/2004 | Wugofski |
| 6,721,706 B1 | 4/2004 | Strubbe |
| 6,724,403 B1 | 4/2004 | Santoro et al. |
| 6,734,909 B1 | 5/2004 | Terane et al. |
| 6,754,548 B1 | 6/2004 | Yoshii et al. |
| 6,795,808 B1 | 9/2004 | Strubbe |
| 6,795,972 B2 | 9/2004 | Rovira |
| 6,882,793 B1 | 4/2005 | Fu et al. |
| 6,934,964 B1 | 8/2005 | Schaffer et al. |
| 6,934,965 B2 | 8/2005 | Gordon |
| 6,938,215 B2 | 8/2005 | Kobayashi |
| 7,055,168 B1 | 5/2006 | Errico |
| 7,079,752 B1 | 7/2006 | Leyendecker |
| 7,124,424 B2 | 10/2006 | Gordon |
| 7,158,713 B2 | 1/2007 | Goto |
| 7,174,126 B2 | 2/2007 | McElhatten |
| 7,174,512 B2 | 2/2007 | Martin |
| 7,178,111 B2 | 2/2007 | Glein |
| 7,257,774 B2 | 4/2007 | Denoue et al. |
| 7,220,910 B2 | 5/2007 | Plastina |
| 7,231,360 B2 | 6/2007 | Sy |
| 7,249,106 B1 | 7/2007 | Tanabe et al. |
| 7,263,551 B2 | 8/2007 | Belfiore |
| 7,275,063 B2 | 9/2007 | Horn |
| 7,281,220 B1 | 10/2007 | Rashkovskiy |
| 7,292,692 B2 | 11/2007 | Bonan et al. |
| 7,324,947 B2 | 1/2008 | Jordan |
| 7,346,917 B2 | 3/2008 | Gatto |
| 7,437,055 B2 | 10/2008 | Hamada |
| 7,441,203 B2 | 10/2008 | Othmer |
| 7,443,418 B2 | 10/2008 | Bryant et al. |
| 7,505,519 B2 | 3/2009 | Gordon |
| 7,512,622 B2 | 3/2009 | Volk et al. |
| 7,546,551 B2 | 6/2009 | Sakata |
| 7,546,627 B2 | 6/2009 | Kawai |
| 7,565,675 B2 | 7/2009 | Sincaglia et al. |
| 7,568,210 B2 | 7/2009 | Asmussen |
| 7,594,177 B2 | 9/2009 | Jojic et al. |
| 7,610,306 B2 | 10/2009 | Lin et al. |
| 7,613,383 B2 | 11/2009 | Yoshida et al. |
| 7,639,308 B2 | 12/2009 | Karaoguz |
| 7,639,943 B1 | 12/2009 | Kalajan |
| 7,640,514 B2 | 12/2009 | Camara et al. |
| 7,650,361 B1 | 1/2010 | Wong et al. |
| 7,698,728 B2 | 4/2010 | Musser |
| 7,711,838 B1 | 5/2010 | Boulter |
| 7,715,690 B1 | 5/2010 | Nomura et al. |
| 7,849,064 B2 | 12/2010 | Hindle |
| 7,853,893 B2 | 12/2010 | Muller et al. |
| 7,917,557 B2 | 3/2011 | Shteyn |
| 7,970,240 B1 | 6/2011 | Chao et al. |
| 7,974,511 B2 | 7/2011 | Mikawa |
| 8,032,010 B2 | 10/2011 | Kim |
| 8,036,516 B2 | 10/2011 | Matsumoto |
| 8,112,711 B2 | 2/2012 | Ackley |
| 8,132,204 B2 | 3/2012 | Haberman |

(56) References Cited

U.S. PATENT DOCUMENTS

| | | |
|---|---|---|
| 8,160,495 B2 | 4/2012 | Khedouri |
| 8,181,218 B2 | 5/2012 | Asmussen |
| 8,238,713 B2 | 8/2012 | Barde et al. |
| 8,291,444 B1 | 10/2012 | Newell |
| 8,549,553 B2 | 10/2013 | Barton et al. |
| 8,707,354 B1 | 4/2014 | Moreau |
| 8,995,003 B2 | 3/2015 | Kim |
| 9,053,754 B2 | 6/2015 | DeYonker |
| 9,165,282 B2 | 10/2015 | Fischer |
| 9,176,643 B2 | 11/2015 | Elia |
| 9,563,702 B2 | 2/2017 | Hannum |
| 9,690,466 B2 | 6/2017 | Coburn |
| 2001/0009007 A1 | 7/2001 | Miyamae et al. |
| 2001/0023436 A1 | 9/2001 | Srinivasan et al. |
| 2001/0037379 A1 | 11/2001 | Livnat |
| 2001/0041049 A1 | 11/2001 | Kanda |
| 2001/0052127 A1 | 12/2001 | Seo et al. |
| 2001/0056434 A1 | 12/2001 | Kaplan et al. |
| 2002/0038457 A1 | 3/2002 | Numata |
| 2002/0040475 A1 | 4/2002 | Yap |
| 2002/0049979 A1 | 4/2002 | White et al. |
| 2002/0056098 A1 | 5/2002 | White |
| 2002/0069418 A1 | 6/2002 | Phillips |
| 2002/0082730 A1 | 6/2002 | Capps |
| 2002/0152461 A1 | 10/2002 | Istvan |
| 2002/0162108 A1 | 10/2002 | Lin-Hendel |
| 2002/0166122 A1 | 11/2002 | Kikinis et al. |
| 2002/0180803 A1 | 12/2002 | Kaplan et al. |
| 2003/0005442 A1 | 1/2003 | Brodersen et al. |
| 2003/0061610 A1 | 3/2003 | Errico |
| 2003/0063897 A1 | 4/2003 | Jung-Kwon |
| 2003/0067554 A1 | 4/2003 | Klarfeld |
| 2003/0088646 A1 | 5/2003 | Yeo |
| 2003/0090504 A1 | 5/2003 | Brook et al. |
| 2003/0093790 A1 | 5/2003 | Logan et al. |
| 2003/0122861 A1 | 7/2003 | Jun et al. |
| 2003/0123853 A1 | 7/2003 | Iwahara |
| 2003/0149988 A1 | 8/2003 | Ellis |
| 2003/0151621 A1 | 8/2003 | McEvilly |
| 2003/0174844 A1 | 9/2003 | Candelore |
| 2003/0208763 A1 | 11/2003 | McElhatten |
| 2003/0237093 A1 | 12/2003 | Marsh |
| 2004/0001106 A1 | 1/2004 | Deutscher et al. |
| 2004/0021669 A1 | 2/2004 | Fredlund et al. |
| 2004/0040041 A1 | 2/2004 | Crawford |
| 2004/0064476 A1 | 4/2004 | Rounds |
| 2004/0068606 A1 | 4/2004 | Kim et al. |
| 2004/0078383 A1 | 4/2004 | Mercer et al. |
| 2004/0201691 A1 | 10/2004 | Bryant |
| 2005/0094031 A1 | 5/2005 | Tecot et al. |
| 2005/0160458 A1 | 7/2005 | Baumgartner |
| 2005/0193416 A1 | 9/2005 | Przybylek |
| 2005/0210414 A1 | 9/2005 | Angiulo |
| 2005/0251807 A1 | 11/2005 | Weel |
| 2006/0048057 A1 | 3/2006 | Herberger et al. |
| 2006/0056796 A1 | 3/2006 | Nishizawa |
| 2006/0064716 A1 | 3/2006 | Sull et al. |
| 2006/0093309 A1 | 5/2006 | Herberger et al. |
| 2006/0107289 A1 | 5/2006 | Deyonker et al. |
| 2006/0168147 A1 | 7/2006 | Inour et al. |
| 2006/0212455 A1 | 9/2006 | Perry et al. |
| 2006/0242106 A1 | 10/2006 | Bank |
| 2007/0022382 A1 | 1/2007 | Honkaniemi |
| 2007/0186241 A1 | 8/2007 | Sugimoto |
| 2007/0220580 A1 | 9/2007 | Putterman et al. |
| 2008/0092168 A1 | 4/2008 | Logan et al. |
| 2009/0129740 A1 | 5/2009 | O'Brien et al. |

FOREIGN PATENT DOCUMENTS

| | | |
|---|---|---|
| EP | 1 058 257 A1 | 12/2000 |
| JP | 11-32301 A | 2/1999 |
| JP | 2000-152180 A | 5/2000 |
| JP | 2002-150503 A | 5/2002 |
| JP | 2002-197806 A | 7/2002 |
| JP | 2003-36652 A | 2/2003 |
| JP | 2003-100055 A | 4/2003 |
| JP | 2003-123389 A | 4/2003 |
| JP | 2004-192779 A | 7/2004 |
| WO | 97/25798 A1 | 7/1997 |
| WO | 99/48296 A1 | 9/1999 |
| WO | 02/32122 A1 | 4/2002 |
| WO | 2005/015902 A1 | 2/2005 |

OTHER PUBLICATIONS

Brent Ethington, Introducing Microsoft Windows 95, Microsoft Press with authenticating declaration of Carmen Debord, 1995.

Fandango Media, LLC's S.P.R. 2.5 Invalidity Contentions which were filed Mar. 26, 2018 in the following litigation: *Maxell, Ltd.* v. *Fandango Media, LLC*, Civil Action No. 2:17-cv-07534 AG-(SSx) (C.D. Cali.), filed Oct. 13, 2017.

Ponceleon, D. et al., "Key to Effective Video Retrieval: Effective Cataloging and Browsing", 1998, pp. 99-107.

Srinivasan, S. et al., "What is in that Video Anyway?", 1999, pp. 388-393.

Pollack, W., "Tuning In: The Future of Copyright Protection for Online Music in the Digital Millennium", Fordham Law Review, 2000, pp. 2445-2488, vol. 68, Issue 6.

LG Electronics U.S.A., Inc. et al., "Zenith Installation and Operating Guide | Warranty" for DVR413 DVD Recorder, May 13, 2004.

Wactlar, H. D. et al., "Lessons Learned from Building a Terabyte Digital Video Library", IEEE, 1999, pp. 66-73.

Japan Patent Office (JPO) office action for JPO patent application JP2008-268104 (Jun. 12, 2009).

Japan Patent Office (JPO) office action for JPO patent application JP2004-349264 (Aug. 6, 2008).

Chinese Intellectual Property Office (SIPO) office action for SIPO patent application CN2005-100935522 (May 26, 2008).

Toshiba HDD & DVD Video Recorder Instruction Manual RD-X5 Operating Instructions, Toshiba Corporation, pp. 148-159 (2004).

Office action for Japan Patent Office patent application JP2008-31843 (Dec. 21, 2010).

Central District of California Case No. 2:17-cv-7534.

Central District of California Case No. 2:17-cv-7538.

*Fandango Media, LLC* v. *Maxell, Ltd.*, Petition for Inter Partes Review of U.S. Pat. No. 9,384,783, Inter Partes Review No. IPR2018-01432 Final Written Decision entered Feb. 10, 2020.

"Guide to ReplayTV", SONICblue Incorporated, 2001, pp. 1-82.

"Real Player Plus Real Player 8 Plus User Manual", Real Networks, 2000, pp. 1-106.

"TiVo DVR User's Guide", Humax Easy Digital, 2004, pp. 1-180.

"Transmission of Non-Telephone Signals Information Technology—Generic Coding of Moving Pictures and Associated Audio Information: Systems", International Telecommunication Union, 1995, pp. 1-119.

Bederson, B. B., "PhotoMesa: A Zoomable Image Browser Using Quantum Treemaps and Bubblemaps", 2001, pp. 71-80.

Ethington, B. et al., "Introducing Microsoft Windows 95" with authenticating Declaration of Carmen Debord, 1995, pp. 1-85.

Furnas, G. W. et al., "Multitrees: Enriching and Reusing Hierarchical Structure" with authenticating Declaration of Scott Delman, Human Factors in Computing Systems, 1994, pp. 330-336.

"Microsoft Computer Dictionary, 4th Ed.", Microsoft, 1999, p. 348.

Cohoon & Davidson, "C++ Program Design: An Introduction to Programming and Object-Oriented Design, 3rd Ed.", 2002, pp. 615-636.

Exhibit D1 to Respondent VIZIO's Invalidity Contentions, Invalidity Claim Chart for U.S. Pat. No. 11,017,815 based on U.S. Patent App. Pub. No. 2003/0208763, pp. 1-273.

Exhibit D2 to Respondent VIZIO's Invalidity Contentions, Invalidity Claim Chart for U.S. Pat. No. 11,017,815 based on U.S. Patent App. Pub. No. 2002/0038457, pp. 1-186.

Exhibit D3 to Respondent VIZIO's Invalidity Contentions, Invalidity Claim Chart for U.S. Pat. No. 11,017,815 based on U.S. Pat. No. 9,563,702, pp. 1-234.

(56) References Cited

OTHER PUBLICATIONS

Exhibit D4 to Respondent VIZIO's Invalidity Contentions, Invalidity Claim Chart for U.S. Pat. No. 11,017,815 based on U.S. Pat. No. 7,546,627, pp. 1-103.
Exhibit D5 to Respondent VIZIO's Invalidity Contentions, Invalidity Claim Chart for U.S. Pat. No. 111,017,815 based on U.S. Pat. No. 6,704,028, pp. 1-184.
Exhibit D6 to Respondent VIZIO's Invalidity Contentions, Invalidity Claim Chart for U.S. Pat. No. 11,017,815 based on U.S. Patent App. Pub. No. 2001/0056434, pp. 1-80.
Exhibit D7 to Respondent VIZIO's Invalidity Contentions, Invalidity Claim Chart for U.S. Pat. No. 11,017,815 based on U.S. Patent App. Pub. No. 2004/0201691, pp. 1-113.
Exhibit D8 to Respondent VIZIO's Invalidity Contentions, Invalidity Claim Chart for U.S. Pat. No. 11,017,815 based on Prior Art References, including U.S. Pat. Nos. 7,174,512, 6,236,395 and 7,639,308, pp. 1-174.
Exhibit D9 to Respondent VIZIO's Invalidity Contentions, Invalidity Claim Chart for U.S. Pat. No. 11,017,815 based on Prior Art References, including U.S. Pat. Nos. 7,174,512, 6,236,395 and 7,639,308, pp. 1-433.
S20 FE 5G (SM-G781x) Service Manuals, 2020.
Galaxy S10 Full Product Specs, gsmarena.com, Aug. 8, 2019.
Samsung, Galaxy S10 Specs, Aug. 5, 2019.
Samsung, S10 User Guide, 2019.
Apple, iPhone guide for IOS 11, 2017.
Apple, iPhone 8—Technical Specs, 2017.
Samsung, S6 (SM-G920x) User Manuals, 2017.
Samsung, S6 (SM-G920x) Service Manuals, 2015.
Samsung, S6 Edge (SM-G925x) User Manuals, 2017.
Samsung, S6 Edge (SM-G925x) Service Manuals, 2015.
Samsung, S6 Edge+ (SM-G928x) User Manuals, 2017.
Samsung, S6 Edge+ (SM-G928x) Service Manuals, 2015.
Samsung, S7 Edge (SM-G935x) User Manuals, 2018.
Samsung, S7 Edge (SM-G935x) Service Manuals, 2016.
Samsung, S7 (SM-G930x) User Manuals, 2018.
Samsung, S7 (SM-G930x) Service Manuals, 2018.
Samsung, S7 Active (SM-G891x) User Manuals, 2018.
Samsung, S7 Active (SM-G891x) Service Manuals, 2016.
Samsung, S8 (SM-G950x) User Manuals, Feb. 2018.
Samsung, S8 (SM-G950x) Service Manuals, 2017.
Samsung, S8+ (SM-G955x) User Manuals, Feb. 2018.
Samsung, S8+ (SM-G955x) Service Manuals, 2017.
Samsung, S8 Active (SM-G892x) User Manuals, Aug. 7, 2019.
Samsung, S8 Active (SM-G892x) Service Manuals, 2017.
Samsung, S9 (SM-G960x) User Manuals, Apr. 2020.
Samsung, S9 (SM-G960x) Service Manuals.
Samsung, S9+ (SM-G965x) User Manuals, Jan. 2019.
Samsung, S9+ (SM-G965x) Service Manuals, 2018, 2020.
Samsung, S10e (SM-G970x) User Manuals, Mar. 7, 2022.
Samsung, S10e (SM-G970x) Service Manuals, 2019.
Samsung, S10 (SM-G973x) User Manuals, Mar. 7, 2022.
Samsung, S10 (SM-G973x) Service Manuals, 2019.
Samsung, S10+ (SM-G975x) User Manuals, Dec. 2020.
Samsung, S10+ (SM-G975x) Service Manuals, 2019.
Samsung, S105G (SM-G977x) User Manuals, Mar. 7, 2022.
Samsung, S105G (SM-G977x) Service Manuals, 2019.
Samsung, S10Lite (SM-G770x) User Manuals, 2023.
Samsung, S10Lite (SM-G770x) Service Manuals, 2019.
Samsung, S20 (SM-G980x) User Manuals, 2022.
Samsung, S20 (SM-G980x) Service Manuals, 2020.
Samsung, S20 5G (SM-G981x) User Manuals, 2023.
Samsung, S20 5G (SM-G981x) Service Manuals, 2020.
Samsung, S20+ (SM-G985x) User Manuals, 2022.
Samsung, S20+ (SM-G985x) Service Manuals, 2020.
Samsung, S20+ 5G (SM-G986x) User Manuals, 2020.
Samsung, S20+ 5G (SM-G986x) Service Manuals, 2020.
Samsung, S20 Ultra LTE/5G (SM-G988x), 2023.
Samsung, S20 Ultra LTE/5G (SM-G988x) Service Manuals, 2020.
Samsung, S20 FE (SM-G780x) User Manuals, Apr. 2021.
Samsung, S20 FE (SM-G780x) Service Manuals, 2021.
S20 FE 5G (SM-G781x) User Manuals, 2023.

EDITING METHOD AND RECORDING AND REPRODUCING DEVICE

INCORPORATION BY REFERENCE

This is a cont. appl. of U.S. patent application Ser. No. 18/244,514, filed Sep. 11, 2023, which is a cont. appl. of U.S. patent application Ser. No. 17/961,183, filed Oct. 6, 2022, now U.S. Pat. No. 11,783,863, which is a cont. appl. of U.S. patent application Ser. No. 17/242,565, filed Apr. 28, 2021, now U.S. Pat. No. 11,468,916, which is a cont. appl. of U.S. patent application Ser. No. 16/883,124, filed May 26, 2020, now U.S. Pat. No. 11,017,815, which is a cont. appl. of U.S. patent application Ser. No. 16/221,908, filed Dec. 17, 2018, now U.S. Pat. No. 10,679,674, which is a cont. appl. of U.S. patent application Ser. No. 15/808,175, filed Nov. 9, 2017, which is a cont. appl. of U.S. patent application Ser. No. 15/176,435, filed Jun. 8, 2016, now U.S. Pat. No. 9,818,449, which is a cont. of U.S. patent application Ser. No. 14/141,417, filed Dec. 26, 2013, now U.S. Pat. No. 9,384,783, which is a cont. of U.S. patent application Ser. No. 12/567,898, filed Sep. 28, 2009, now U.S. Pat. No. 8,644,684, which is a cont. of U.S. patent application Ser. No. 11/203,457, filed on Aug. 11, 2005, now U.S. Pat. No. 7,613,383, which application claims priority from Japanese Patent Appl. Nos. JP2004-349264, filed Dec. 2, 2004, JP2004-378767, filed Dec. 28, 2004, and JP2004-378768, filed Dec. 28, 2004, the entire disclosures of which are incorporated herein by reference for all purposes.

BACKGROUND OF THE INVENTION

Field of the Invention

The present invention relates to a recording and reproducing device which records data onto a recording medium and reproduces data from the recording medium.

Description of the Related Art

As the high-efficiency coding technique advances, it has become possible to handle AV data such as video data and audio data as digital data, conduct code rate compression, and record resultant data on a large-capacity recording medium such as a hard disk or a recording type optical disk in real time. When digital data already compressed in code rate is inputted to a recording and reproducing device having such a recording medium from outside by broadcasting or communication, it is also possible to record the digital data on the recording medium intact.

In these recording and reproducing devices, management information for managing digital data to be recorded is generated and recorded together onto the same recording medium. When a rewritable recording medium is used, the user can conduct editing work on the recording and reproducing device by rewriting the management information and generating and manipulating a list indicating the reproduction sequence (hereafter referred to as play list) (see, for example, JP-A-2000-152180).

SUMMARY OF THE INVENTION

In the above-described conventional technique, it is mentioned that the play list indicates the reproduction sequence by linking portions of AV data together. As an example, a management state of AV data on a recording medium in the above-described conventional technique is shown in FIG. 2.

Reference numeral 201 designates AV data themselves on the recording medium. The case where a program #1 to a program #3 are present as recording units is shown. Reference numeral 202 designates a second management hierarchical level (management level 2) in management information. Original cell information #1 to original cell information #3 indicate the whole reproduction range of program units, i.e., a program #1 to a program #3, respectively. Each of user-defined cell information #1 to user-defined information #2 indicates a reproduction range of the whole or a part of a program arbitrarily specified by the user. The number of the user-defined cell information #1 to user-defined information #2 is increased or decreased by the user's editing manipulation. Reference numeral 203 designates a first management hierarchical level (management level 1). Program information contains all of the original cell information #1 to original cell information #3. By conducting reproduction on the basis of the program set information, the user can reproduce all AV data recorded on the recording medium. Play list information #1 to play list information #k indicate a reproduction sequence of the user-defined cell information arbitrarily specified by the user. It is possible to have a plurality of reproduction sequences. Inside of a frame 204 becomes original information for managing the whole AV data in the management information. Inside of a frame 205 becomes user-defined information for managing the play list obtained by the user's editing manipulation.

In FIG. 2, the play list information is placed on the same level with the program set information and managed as the management level 1. Therefore, the sequence of a plurality of play list information pieces themselves is determined uniquely. For example, as for a catalog of the play lists, it is impossible on the user's interface to alter the display sequence. In view of the problem, the present invention has been achieved. An object of the present invention is to provide a recording scheme and device in which the user can conduct manipulation of arbitrarily rearranging the display sequence of the play lists in the play list catalog on the user interface.

Furthermore, in the conventional technique example, attention is not paid to that a plurality of users generate, select and manage favorite play list information. For example, even when a plurality of users desire to generate, select and manage respective favorite play list information pieces, it cannot be implemented. Furthermore, attention is not especially paid to that a user select some arbitrary play lists from among a plurality of play lists and manage them.

In view of these problems, the present invention has been achieved. An object of the present invention is to provide a recording and reproducing device in which the user can select and manage arbitrary play lists.

In order to achieve the objects, in accordance with the present invention, a unit of management for managing all registered play list information and an upper management hierarchical level are added. The unit of management is adapted to be handled on the same level with unified information that indicates a reproduction range of all AV data. User-defined unified information is adapted to be handled on the added management hierarchical level. The user-defined unified information is formed to allow arbitrary reproduction ranges contained on a lower hierarchical level to be registered.

In a recording and reproducing device according to the present invention, it becomes possible for the user to select arbitrary play lists or reproduction ranges and conduct management. Even in the case where a plurality of users share a single recording medium, therefore, each user can manage favorite reproduction contents, resulting in improved usage. Since the play lists are subject to unified management, it becomes possible for the user to arbitrarily alter the display sequence of play lists.

According to the present invention, a recording and reproducing device improved in usage can be provided.

Other objects, features and advantages of the invention will become apparent from the following description of the embodiments of the invention taken in conjunction with the accompanying drawings.

DESCRIPTION OF THE EMBODIMENTS

Figure 1:
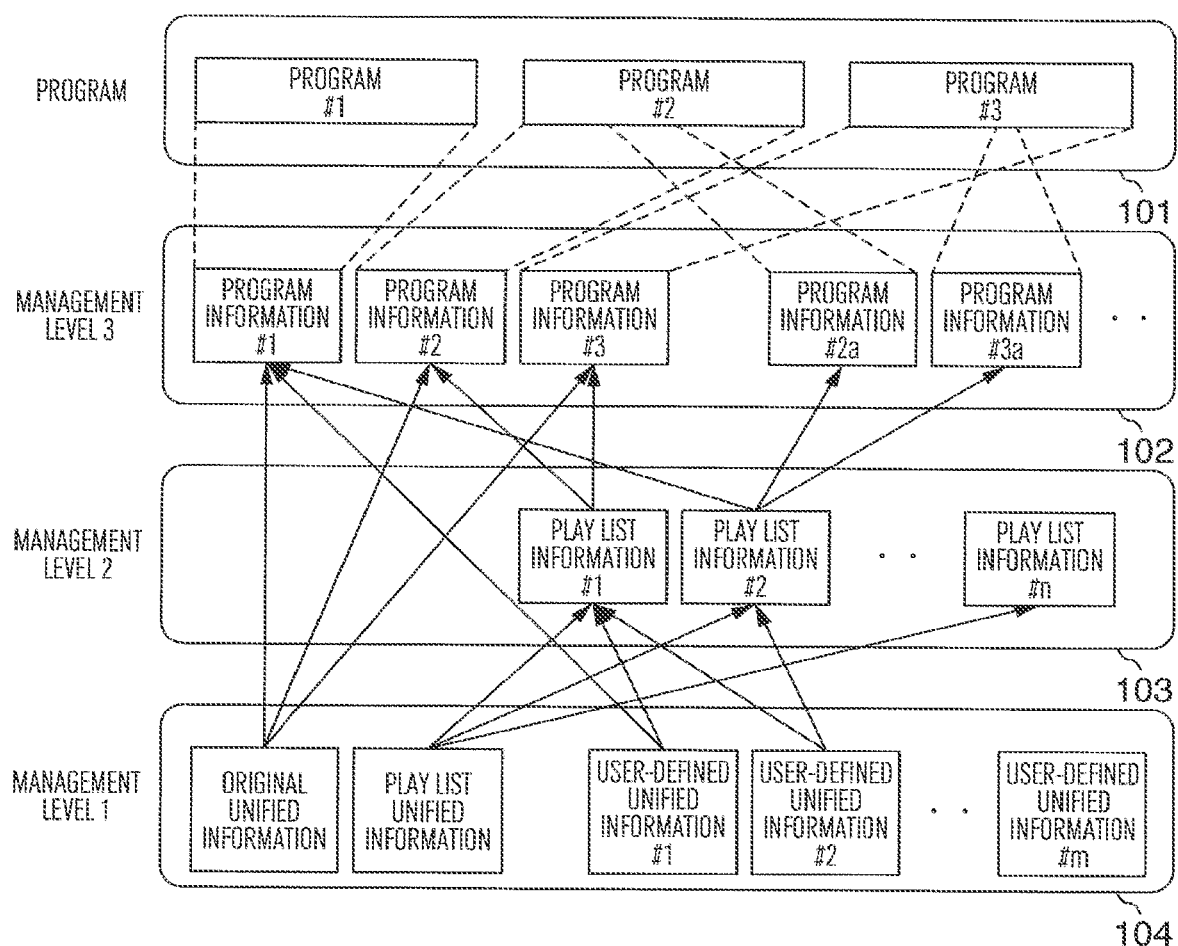
FIG. 1 shows a management state of AV data in a recording and reproducing device according to an embodiment of this invention.

Hereafter, embodiments of the present invention will be described with reference to the drawings. FIG. 1 shows a management state of AV data on a recording medium in a recording and reproducing device according to the present invention. In the same way as the reference numeral 201 in FIG. 2, reference numeral 101 designates AV data themselves on the recording medium. The case where programs #1 to #3 are present as recording units is shown.

Figure 2:
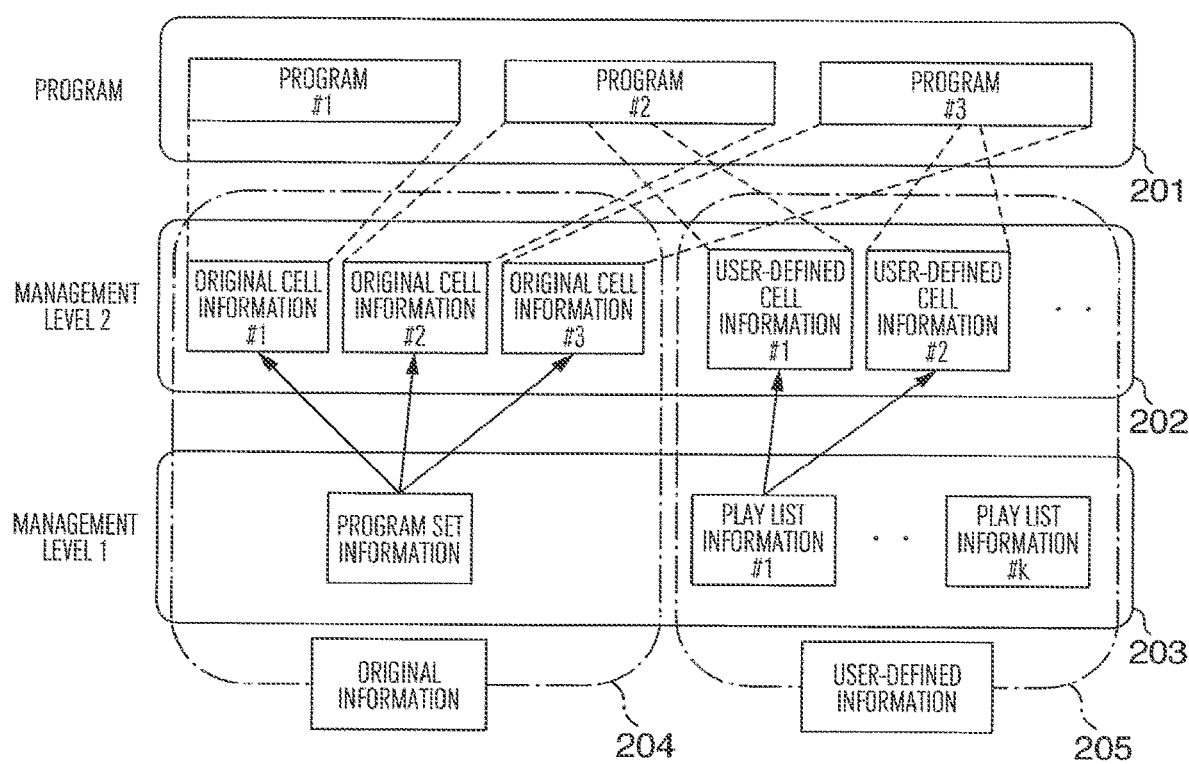
FIG. 2 shows a management state of AV data in a conventional technique example.

Reference numeral 102 corresponds to 202 in FIG. 2. However, reference numeral 102 designates a third management hierarchical level (management level 3) in management information. Program information #1 to program information #3 indicate the whole reproduction ranges of program units, i.e., program #1 to program #3, respectively. Each of program information #2a to program information #3a indicates a reproduction range of the whole or a part of a program arbitrarily specified by the user. The program information #2a to program information #3a indicate a part of the program #2 and a part of the program #3, respectively. In places corresponding to the program information #1 to program information #3, information is also added, as AV data is added, i.e., with an increase in programs. In places corresponding to the program information #2a to the program information #3a, the number of information pieces increases or decreases due to the editing manipulation of the user.

Reference numeral 103 corresponds to the management level 1 in FIG. 2. However, numeral 103 designates a second management hierarchical level (management level 2), which includes only play list information #1 to play list information #n. Each play list information indicates a reproduction sequence of arbitrary program information pieces on the management level 3. It is possible to have a plurality of reproduction sequences.

Reference numeral 104 designates a newly added first management hierarchical level (management level 1) in the management information as a feature point of the present invention. The management level 1 includes a plurality of unified information pieces. Original unified information corresponds to the program set information shown in FIG. 2. The original unified information contains all of the program information #1 to program information #3 on the management level 3. By conducting reproduction on the basis of all of the program information #1 to program information #3, it becomes possible for the user to reproduce all AV data recorded on the recording medium. Play list unified information contains all of the play list information #1 to play list information #n on the management level 2. By conducting reproduction on the basis of all of the play list information #1 to play list information #n on the management level 2, it becomes possible for the user to successively reproduce all registered play lists. User-defined unified information #1 to user-defined unified information #m contain arbitrary one or more from among play list information pieces on the management level 2 and program information pieces on the management level 3. For example, when a plurality of users use a single recording medium, it becomes possible to manage reproduced contents that meet respective users' tastes by using one user-defined unified information every user.

An embodiment of a recording and reproducing device according to the present invention will be described more specifically by using another drawing.

Figure 3:
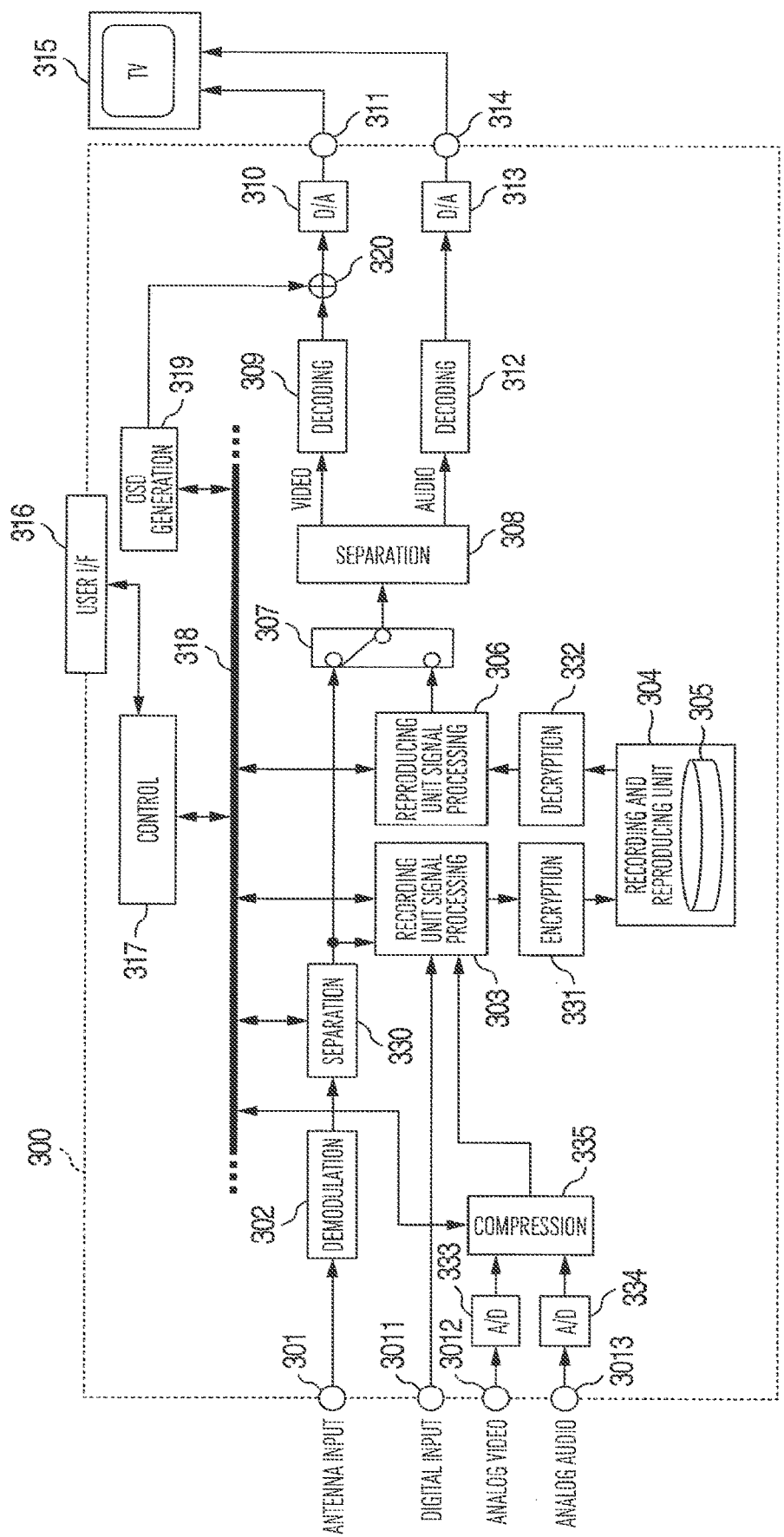
FIG. 3 shows a block diagram of a recording and reproducing device according to an embodiment of this invention.

FIG. 3 is a block diagram showing an example of a recording and reproducing device according to the present invention. A recording and reproducing device capable of receiving digital broadcast, recording the digital broadcast on a recording medium, reproducing recorded data, and obtaining a reproduced output is shown. Reference numeral 300 designates a recording and reproducing device, 301 an input terminal supplied with a received wave from an antenna, 3011 an input terminal supplied with compressed video and audio data from another device, 3012 an analog video input terminal supplied with an analog video signal, 3013 an analog audio input terminal supplied with an analog audio input terminal, 333 and 334 analog/digital (A/D) conversion circuits each of which converts an analog signal to a digital signal, 302 a demodulation circuit, 330 a separation circuit which separates the demodulated digital signal into audio, video and other data, 335 a compression circuit which compresses digitized video and audio signals, 303 a recording unit signal processing circuit, 331 an encryption circuit which encrypts data to be recorded, 304 a recording and reproducing unit including a drive function of a recording medium, 305 a recording medium, 332 a decryption circuit which decrypts data encrypted and recorded on the recording medium, 306 a reproducing unit signal processing circuit, 307 a switchover circuit, 308 a separation circuit, 309 a video decoding circuit, 310 a digital/analog (D/A) conversion circuit, 311 a video output terminal, 312 an audio decoding circuit, 313 a D/A conversion circuit, 314 an audio output terminal, 315 a TV set, 316 a user I/F, 317 a control unit, 318 a system bus, 319 an OSD generation unit, and 320 an addition circuit.

At the time of recording, a signal transmitted by digital broadcast or the like and received is demodulated in the demodulation circuit 302 by using a predetermined scheme, subjected to necessary signal processing such as timing adjusting data addition and modulation in the recording unit signal processing circuit 303, encrypted in the encryption circuit 331, and then recorded on the recording medium 305 by the recording and reproducing unit 304. A digital signal input from the digital input terminal 3011 is subjected to necessary signal processing such as timing adjusting data addition and modulation in the recording unit signal processing circuit 303, encrypted in the encryption circuit 331, and then recorded on the recording medium 305 by the recording and reproducing unit 304. An analog video signal input from the analog video input terminal 3012 and an analog audio signal input from the analog audio input terminal 3013 are subjected to compression processing in the compression circuit 335, encrypted in the encryption circuit 331 via the recording unit signal processing circuit 303, and then recorded on the recording medium 305 by the recording and reproducing unit 304.

At the time of reproducing, encrypted digital data read out from the recording medium 305 via the recording and reproducing unit 304 in accordance with the user's order is decrypted in the decryption circuit 332, subjected to signal processing required for reproduction such as demodulation in a form based on a predetermined modulation scheme in the reproducing unit signal processing circuit 103, and sent to the separation circuit 308 via the switchover circuit 307. Resultant video digital data is subjected to predetermined video decoding processing in the video decoding circuit 309, converted to an analog signal in the D/A conversion circuit 310, and then displayed as a monitor output on the TV set 315 via the video output terminal 311. Audio digital data obtained from the separation circuit 308 is subjected to predetermined audio decoding processing in the audio decoding circuit 312, converted to an analog signal in the D/A conversion circuit 313, and then outputted by an audio output mechanism in the TV set 315 via the audio output terminal 314.

The control unit 317 controls various components in the recording and reproducing device 300 via the system bus 318. Furthermore, the control unit 317 controls the whole device to cause operation based on the user's order input which is inputted via the user I/F 316 to be conducted. By the way, an order input request to the user or necessary OSD display for the user is implemented by preparing it in the OSD generation unit 319, adding it to an output of the video decoding circuit 309 on a suitable level, and finally outputting it to a monitor screen on the TV set 315.

The case where each unified information on the management level 1 is used for menu display of recording data will now be described as a specific use example of the management information configuration in FIG. 1.

Figure 4:
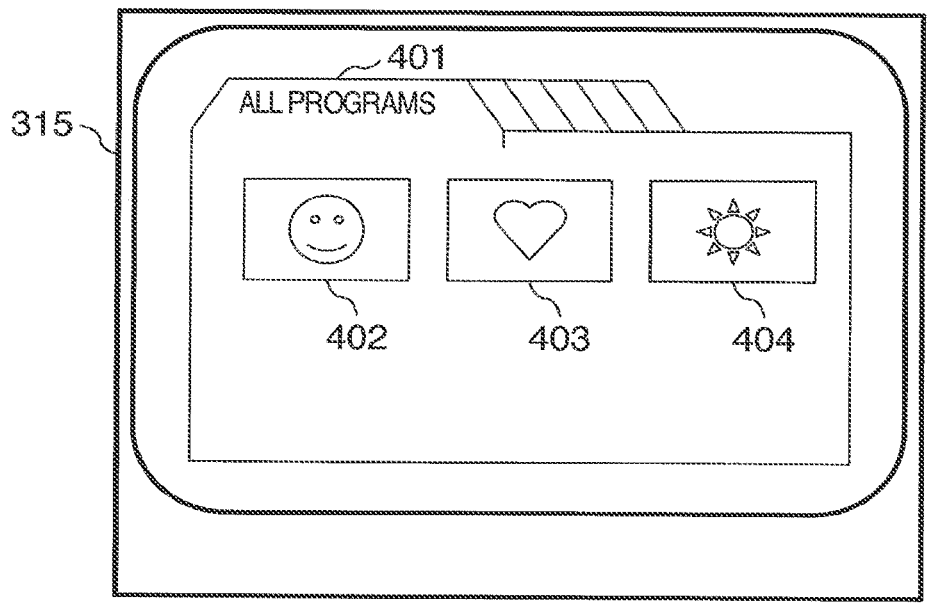
FIG. 4 shows a display output example of original unified information.

FIG. 4 shows an example in which menu display is conducted by using the original unified information shown in FIG. 1. Reference numeral 315 designates the TV set shown in FIG. 3, 401 a tag for displaying all programs, 402 a thumbnail indicating program information #1, 403 a thumbnail indicating program information #2, and 404 a thumbnail indicating program information #3. The user moves a cursor position on the screen to a desired thumbnail and conducts selection and determination by using a remote controller or the like. As a result, the user can reproduce arbitrary programs or all programs.

Figure 5:
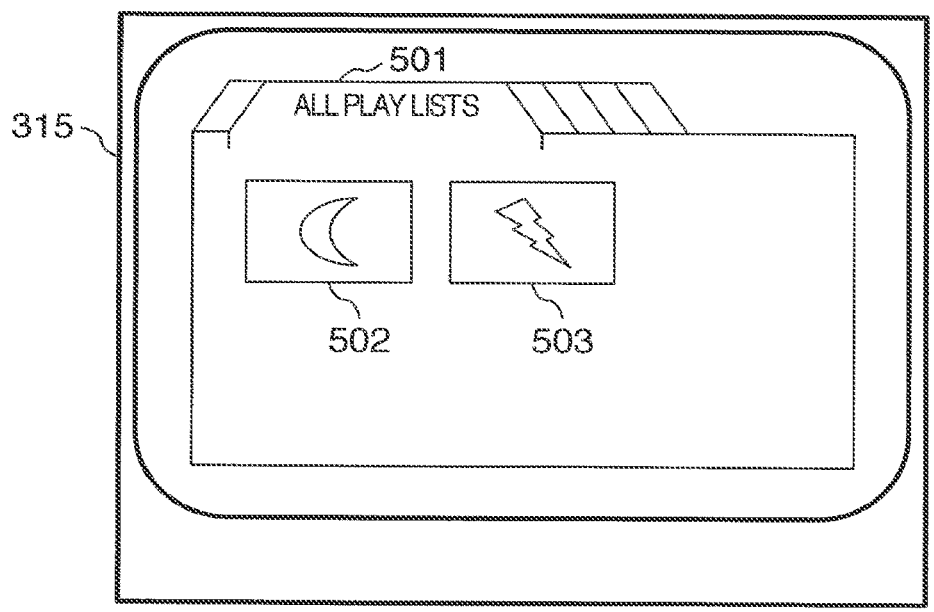
FIG. 5 shows a display output example of play list unified information.

FIG. 5 shows an example in which menu display is conducted by using the play list unified information shown in FIG. 1. Reference numeral 501 designates a tag for displaying all play lists, 502 a thumbnail indicating play list information #1, and 503 a thumbnail indicating play list information #2. In the same way as the above-described case, the user moves a cursor position on the screen to a desired thumbnail and conducts selection and determination by using a remote controller or the like. As a result, the user can reproduce arbitrary play lists or all play lists. By the way, display switching from the all program display tag 401 to all play list display tag can be implemented by, for example, movement of the cursor in tag character positions conducted by the user.

Figure 6:
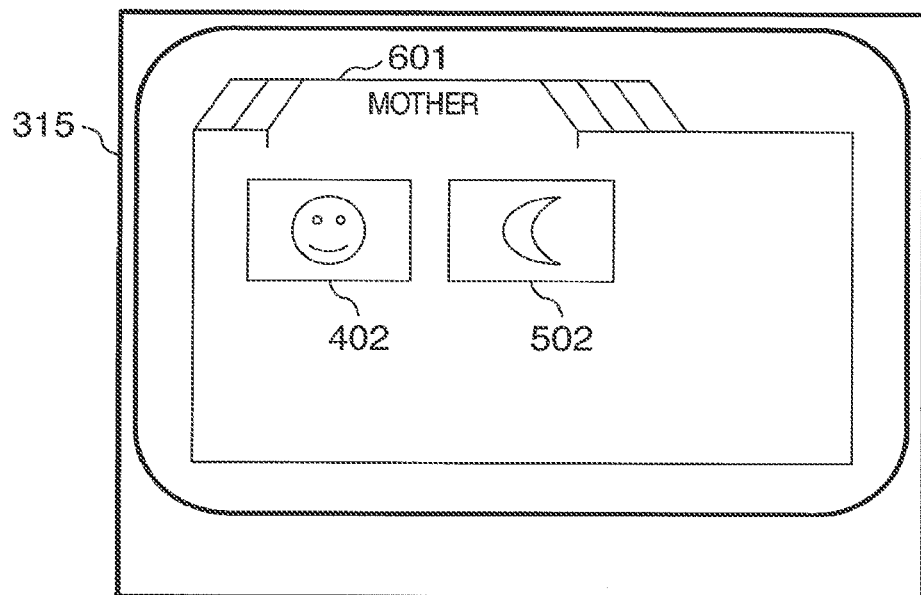
FIG. 6 shows a first output example of user-defined unified information.
Figure 7:
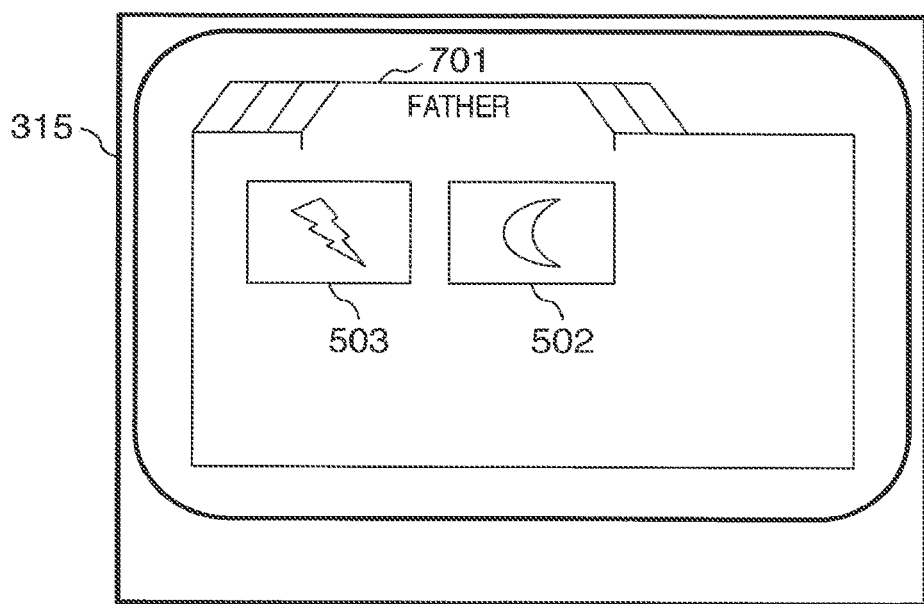
FIG. 7 shows a second output example of user-defined unified information.

FIG. 6 shows an example in which menu display is conducted by using the user-defined unified information #1 shown in FIG. 1. Reference numeral 601 designates a menu display tag for user #1 (who is supposed to be "mother" here). As appreciated from FIG. 1, reference numerals 402 and 502 designate thumbnails indicating the program information #1 and the play list information #1, respectively. The "mother" can use the menu display tag for mother 601 as a folder dedicated to herself, and freely register and delete data to be reproduced. In the same way, FIG. 7 shows an example in which menu display is conducted by using the user-defined unified information #2 shown in FIG. 1. Reference numeral 701 designates a menu display tag for user #2 (who is supposed to be "father" here). As appreciated from FIG. 1, reference numerals 503 and 502 designate thumbnails indicating the play list information #2 and the play list information #1, respectively. In this case, the "father" selects two play lists. However, the reproduction sequence of them can be altered. In the same way as the "mother," the "father" can use the menu display tag for father 701 as a folder dedicated to himself, and freely register and delete data to be reproduced.

As heretofore described, in the embodiment of the present invention, a unit of management for managing all registered play list information and an upper management hierarchical level are added. The unit of management is adapted to be handled on the same level with unified information that indicates a reproduction range of all AV data. User-defined unified information is adapted to be handled on the added management hierarchical level. The user-defined unified information is formed to allow arbitrary reproduction ranges contained on a lower hierarchical level to be registered therein. As a result, it becomes possible for the user to select arbitrary play lists or reproduction ranges and conduct management. Even in the case where a plurality of users share a single recording medium, therefore, each user can manage favorite reproduction contents, resulting in improved usage.

In the embodiment heretofore described, the case where digital broadcast is received and digital data is recorded intact has been described. However, this is not restrictive. A configuration having a network I/F to acquire AV data from an external network or having coding unit to conduct recording onto the recording medium while coding analog data may also be used. In other words, the present embodiment refers to data management on the recording medium, and its input route is not especially restricted.

Figure 8:
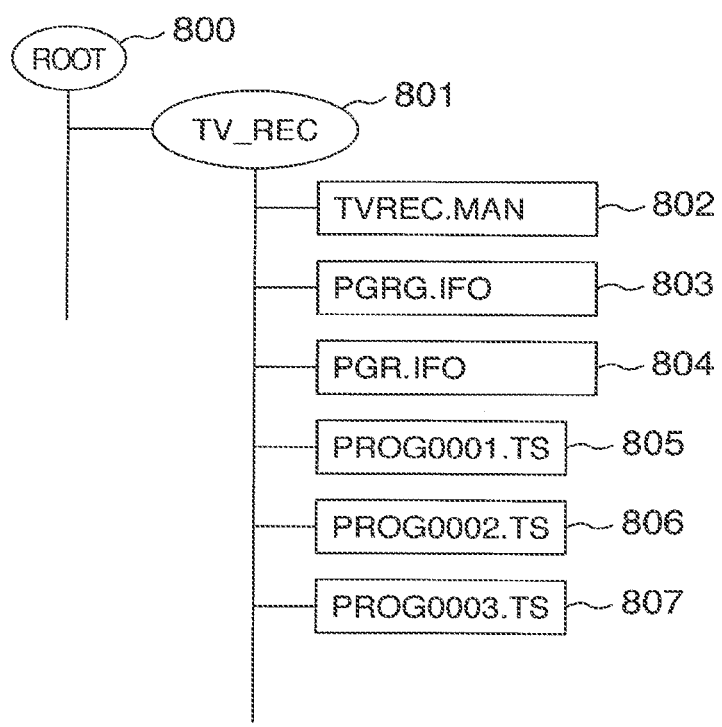
FIG. 8 shows an example of a file structure of original unified information, play list unified information, user-defined unified information, play list information, program information, and AV data (program)

FIG. 8 shows an example of file configurations used to actually record the program, program information, play list information, original unified information, play list unified information, and user-defined information on the recording medium 305 (FIG. 3). The recording medium is a medium on which digital recording and reproducing is conducted. Files on the medium are managed by a file system similar to that used to manage a recording medium in the so-called personal computer or the like. In FIG. 8, "ROOT" 800 represents a highest hierarchical level of a file directory. "TV_REC" 801 is a directory under the highest hierarchical level. "TVREC.MAN" 802, "PGRG.IFO" 803, "PGR.IFO" 804, "PROG0001.TS" 805, of files which implement the management structure shown in FIG. 1 according to the present invention are recorded in the "TV_REC" 801. In the "TVREC.MAN" 802, the original unified information, the play list unified information, and the user-defined unified information #1 to #m on the management level 1 shown in FIG. 1 are described as management tables. In the "PGRG.IFO" 803, the play list information #1 to the play list information #n on the management level 2 shown in FIG. 1 are recorded as management tables. In the "PGR.IFO" 804, the program information #1 to the program information #3a on the management level 3 shown in FIG. 1 are recorded as management tables. "PROG0001.TS" 805, "PROG0002.TS" 806 and "PROG0003.TS" 807 are entity files of AV data in each program. For example, AV data between recording start and recording end of one time is recorded in the "PROG0001. TS." AV data between recording start and recording end of the next time is recorded in the "PROG0002. TS." In this way, the file name is updated and recording is conducted. Thereafter, the management files 802 to 804 are updated.

The file structure and the configuration of management tables themselves concerning the management structure "TVREC.MAN" 802, "PGRG.IFO" 803, "PGR.IFO" 804, "PROG0001.TS" 805, . . . of files may be formed by using any method. However, an example of how to implement the management configuration in the case of FIG. 1 using the files will now be described.

Figure 9:
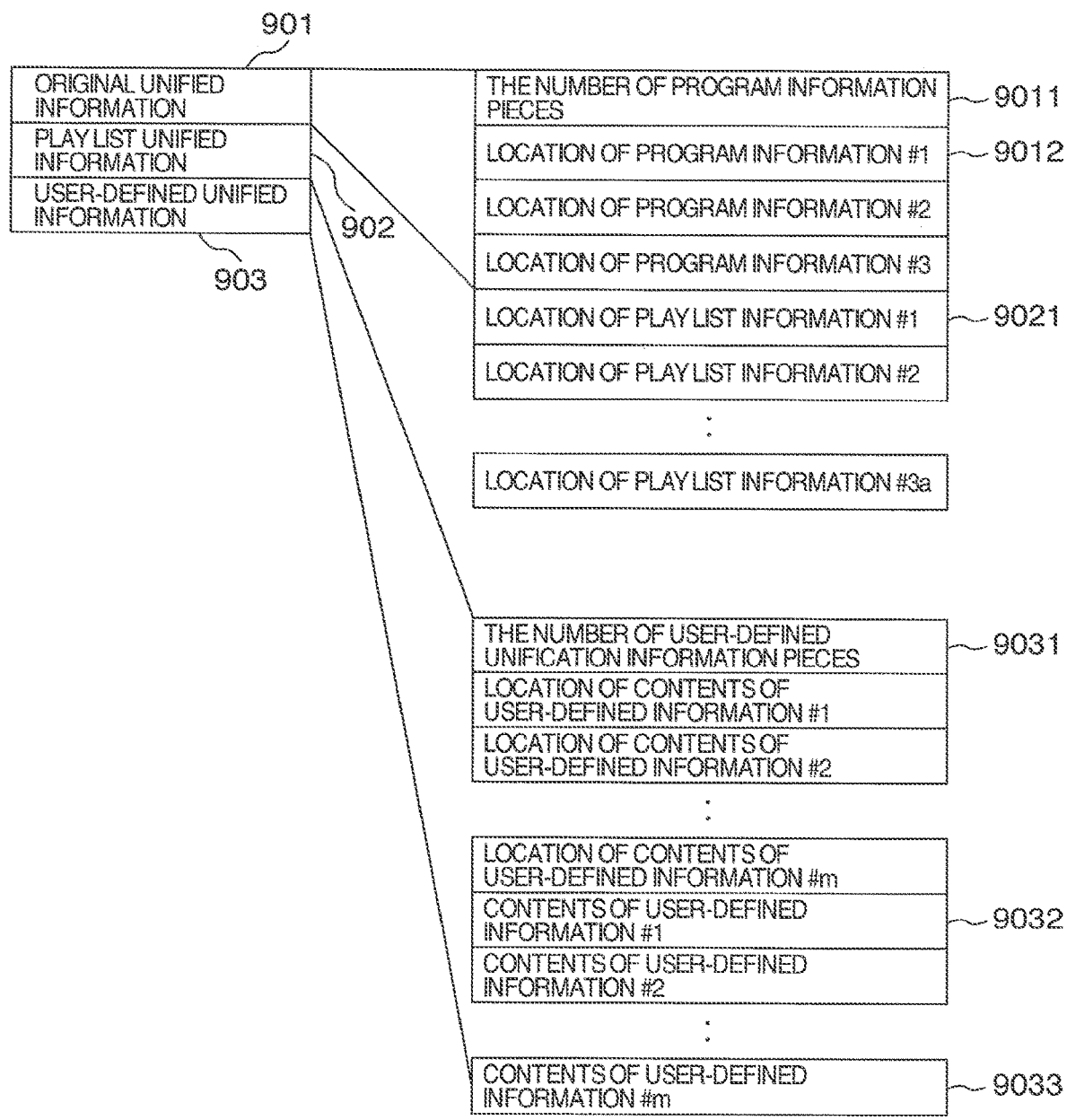
FIG. 9 shows an example of a management table structure of original unified information, play list unified information, and user-defined unified information.

FIG. 9 shows a configuration of management tables of the "TVREC.MAN" 802 (FIG. 8). As original unified information 901, the number of AV data recorded as the number of program information pieces 9011, i.e., the total number (three in this case) of entity files ("PROG0001.TS" 805, "PROG0002.TS" 806 and "PROG0003.TS" 807) of the AV data is described. Under the original unified information 901, location tables 9012 of respective original program information pieces are recorded. As play list unified information 902, play list location information tables are recorded in 9021 and subsequent tables. In 9031, the number of user-defined unified information pieces is recorded. After that, contents of #1 to #m of the user-defined information are recorded.

Figure 13:
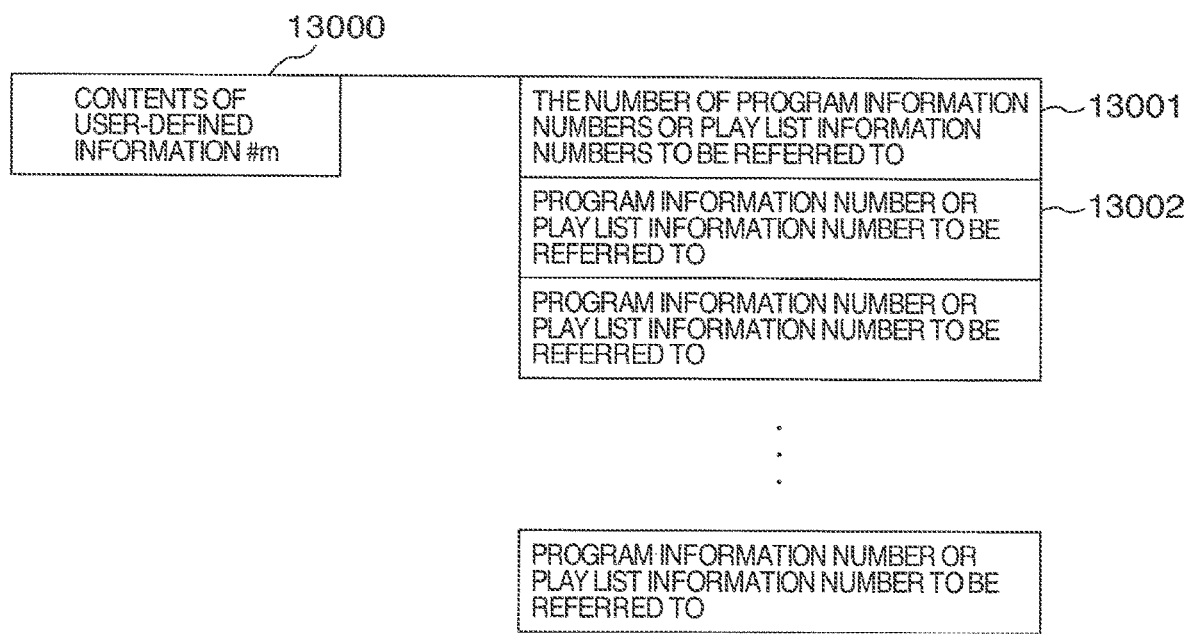
FIG. 13 shows an example of a table indicating contents of user-defined information #m.

FIG. 13 shows contents of the user-defined information #m described above. The user-defines information #m has combinations of original program information and play list information as a table.

Figure 10:
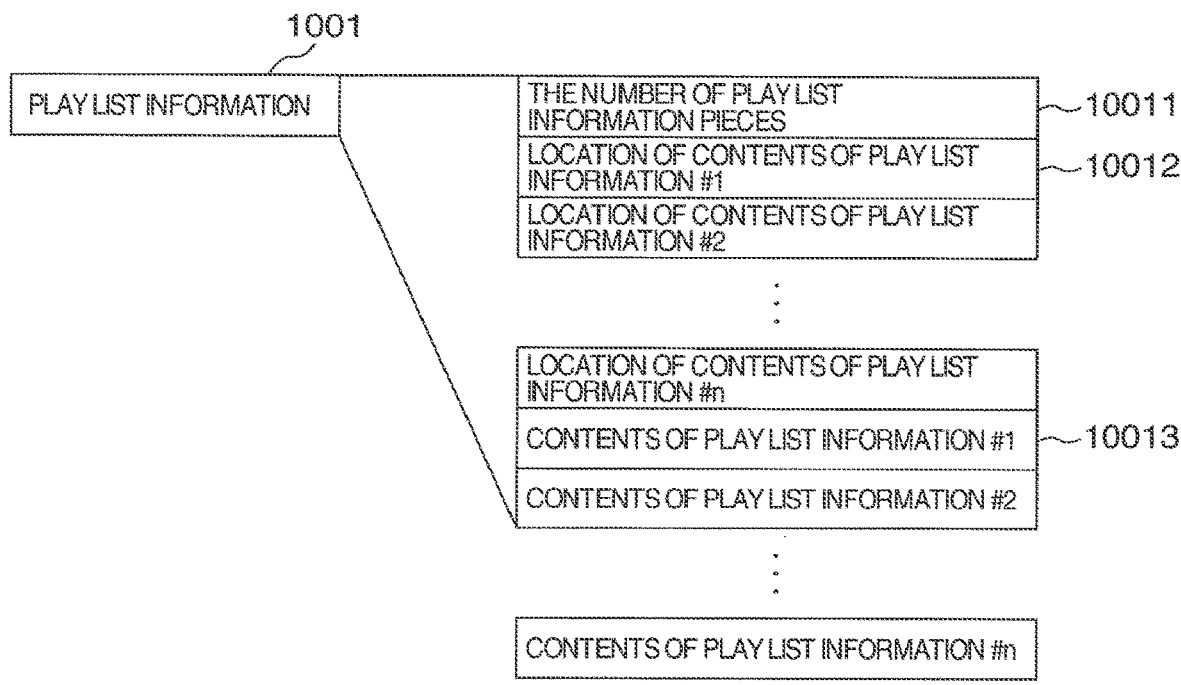
FIG. 10 shows an example of a management table of play list information.

FIG. 10 shows a management table of the "PGRG.IFO" 803 (FIG. 8), which corresponds to the management level 2 shown in FIG. 1. As play list information 1001, the total number of the play list information pieces is first described as designated by 10011. (In this case, the total number of the play list information pieces is n.) Beginning with 10012 indicated under the reference numeral 10011, locations in which contents of the play list information #1 to #n are described are recorded as tables. Beginning with 10013, contents of the play list information #1 to #n (contents of the reproduction sequence, which are management tables having combinations of program information indicating the reproduction start location and reproduction end location of AV data described later) are recorded.

Figure 11:
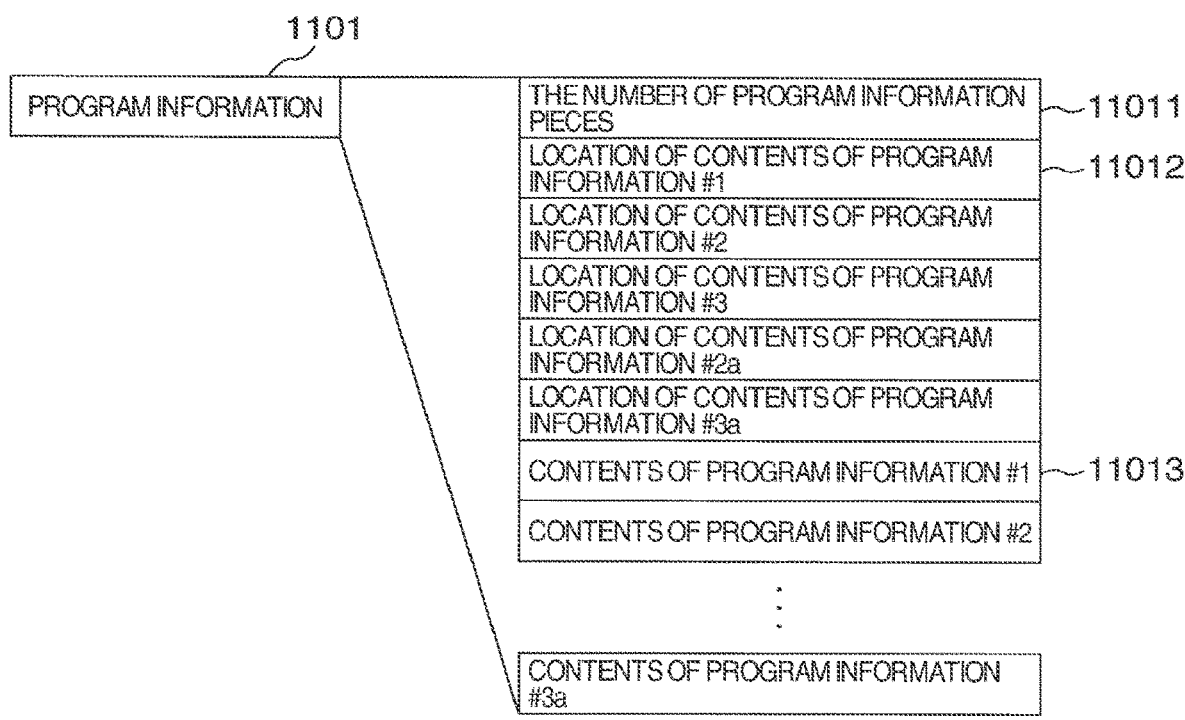
FIG. 11 shows an example of a management table of program list information.

FIG. 11 shows a management table of the "PGR.IFO" 804 (FIG. 8), which corresponds to the management level 3 shown in FIG. 1. As program information 1101, the total number of the program information pieces including all of the program information pieces paired with the original information program #1, #2 and #3 (FIG. 1) and the user-defined program information #2a and #3a (FIG. 1) is recorded as designated by 11011. Beginning with 11012 indicated under the reference numeral 11011, tables indicating locations in which contents of the program information #1 to #3a are described are recorded. Beginning with 11013, contents of the program information #1 to #3a (describing the reproduction start location and reproduction end location of the "PROG0001.TS" 805, "PROG0002.TS" 806 and "PROG0003.TS" 807 (FIG. 8)) are recorded.

Figure 12:
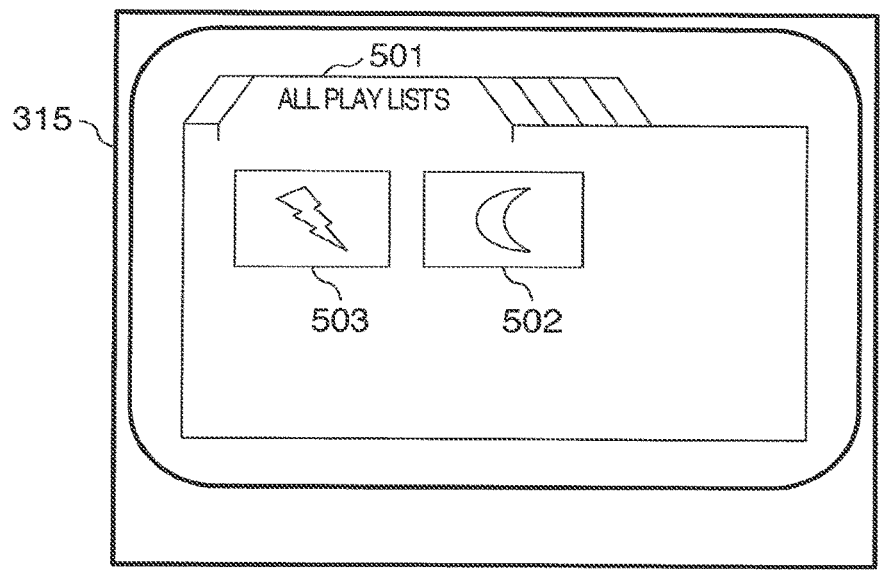
FIG. 12 shows a display output example of play list unified information.

By conducting the management as heretofore described, it becomes possible to sort the location information, for example, in the play list location table 9021 and alter the sequence of displaying play lists on a GUI view from the state shown in FIG. 5 to the state shown in FIG. 12. In the case where the number of play lists has become very large, a play list that is high in user's use frequency can be displayed in the first place in the GUI view. As a result, it is possible to implement a usable recording and reproducing device, reproducing device, or recording method. For example, a plurality of users can set play lists that they want to view and recorded original contents freely and individually. Even when the number of recorded programs is very large, the user can rapidly find out a program that the user wants to view, because the user can refer to a folder defined by the user.

In the present embodiment, a clear distinction is made between the user-defined play list unified information and the user-defined unified information #1 to #m. The user-defined play list unified information may be defined as user-defined play list unified information having no link to the original program information of the user-defined unified information.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information processing apparatus comprising:
a network interface;
a display configured to display a video;
an audio output circuitry configured to output an audio;
a user manipulation input circuitry configured to receive a user manipulation; and
a processor for controlling the display to display, wherein
a plurality of program or playlist information including first program
or playlist information received wirelessly by the network interface over a
network from another information processing apparatus and stored,
at least some of the plurality of program or playlist information is
associated with a user profile,
the processor controls the display to display:
a first area including a first character associated with a first group of program or playlist information for a first classification and a second
character associated with a second group of program or playlist information
for a second classification different from the first classification, the first group
of program or playlist information being configured to allow a user to edit,
wherein the first group of program or playlist information and the second
group of program or playlist information are part of the plurality of stored
program or playlist information, and
  a second area displaying thumbnails corresponding to at least a
portion of the plurality of stored program or playlist information,
    wherein user selection of the first character enables the display of
a first group of thumbnails corresponding to the first group of program or
playlist information in the second area,
    wherein user selection of the second character enables the display
of a second group of thumbnails corresponding to the second group of program
or playlist information in the second area,
    wherein, upon one program or playlist information stored on the
recording medium included in both the first group of program or playlist information and the second group of program or playlist information being deleted from the first group of program or playlist information, the one program or playlist information continues to be included in the second group of program or playlist information and the processor controls the display to display a thumbnail corresponding to the one program or playlist information as one of the second group of thumbnails when the second character is selected.

2. The information processing apparatus of claim 1, further comprising:
  wherein the processor generates a group of program or playlist information based on user preferences determined by the user selections of the program or playlist information, and
  wherein, upon user selection of the group, the processor controls the display to display thumbnails that correspond to the program or playlist information and no other thumbnails associated with program or playlist information of other users.

3. The information processing apparatus of claim 1, further comprising:
  an antenna for wirelessly receiving the first program or playlist information from the other information processing apparatus.

4. The information processing apparatus of claim 1,
  wherein the plurality of stored program or playlist information includes third program or playlist information, fourth program or playlist information, and fifth program or playlist information,
  wherein the display displays a user interface having thumbnails corresponding to each of the third, fourth, and fifth program or playlist information.

5. The information processing apparatus of claim 4,
  wherein the display displays the third, fourth, and fifth program or playlist information according to predetermined playback sequence.

6. The information processing apparatus of claim 1,
  wherein the plurality of stored program or playlist information includes third program or playlist information, fourth program or playlist information, and fifth program or playlist information,
  wherein the plurality of stored program or playlist information includes management information corresponding to the third, fourth, and fifth program or playlist information, and
  wherein the management information includes filename information and timing information for each of the third, fourth, and fifth program or playlist information.

7. The information processing apparatus of claim 1, wherein the processor is configured to allow the plurality of program or playlist information to playback in an arbitrary playback sequence.

8. The information processing apparatus of claim 1, further comprising:
  an on screen display generator generating on screen display information,
  wherein the plurality of stored program or playlist information includes third program or playlist information such that, upon selection for playback, the third program or playlist information is outputted with the on screen display information for display of the third program or playlist information and the on screen display information.

9. An information processing method implemented on an information processing apparatus, the information processing method comprising:
  storing a plurality of program or playlist information including first program or playlist information received wirelessly by a network interface over a network from another information processing apparatus, wherein at least some of the plurality of program or playlist information is associated with a user profile;
  outputting an audio;
  displaying a video: and
  inputting a user manipulation,
  wherein a first area including a first character associated with a first group of program or playlist information for a first classification and a second character associated with a second group of program or playlist information for a second classification different from the first classification, the first group of program or playlist information being configured to allow a user to edit,
wherein the first group of program or playlist information and the second group of program or playlist information are part of the plurality of stored program or playlist information, and
  a second area displaying thumbnails corresponding to at least a portion of the plurality of stored program or playlist information,
  wherein user selection of the first character enables the display of a first group of thumbnails corresponding to the first group of program or playlist information in the second area, and
  wherein user selection of the second character enables the display of a second group of thumbnails corresponding to the second group of program or playlist information in the second area;
  upon one program or playlist information stored on a recording medium included in both the first group of program or playlist information and the second group of program or playlist information being deleted from the first group of program or playlist information, the one program or playlist information continues to be included in the second group of program or playlist information, and displaying a thumbnail corresponding to the one program or playlist information as one of the second group of thumbnails when the second character is selected;

wherein the processor generating a group of program or playlist information based on user preferences determined by the user selections of the program or playlist information, and upon user selection of the group, displaying thumbnails that correspond to the program or playlist information and no other thumbnails associated with program or playlist information of other users.

10. The information processing method of claim 9, further comprising:

wirelessly receiving the first program or playlist information from the other information processing apparatus via an antenna of the information processing apparatus.

11. The information processing method of claim 9, wherein the plurality of stored program or playlist information includes third program or playlist information, fourth program or playlist information, and fifth program or playlist information, wherein the information processing apparatus displays a user interface having thumbnails corresponding to each of the third, fourth, and fifth program or playlist information.

12. The information processing method of claim 11, wherein the information processing apparatus displays the third, fourth, and fifth program or playlist information according to predetermined playback sequence.

13. The information processing method of claim 9, wherein the plurality of stored program or playlist information includes third program or playlist information, fourth program or playlist information, and fifth program or playlist information, wherein the plurality of stored program or playlist information includes management information corresponding to the third, fourth, and fifth program or playlist information, wherein the management information includes filename information and timing information for each of the third, fourth, and fifth program or playlist information.

14. The information processing method of claim 9, wherein the processor is configured to allow the plurality of program or playlist information to playback in an arbitrary playback sequence.

15. The information processing method of claim 9, further comprising:

generating, by the information processing apparatus, on screen display information, wherein the plurality of stored program or playlist information includes third program or playlist information such that, upon selection for playback, the third program or playlist information is outputted with the on screen display information for display of the third program or playlist information and the on screen display information.

16. A method for reproducing program or playlist content associated with user profiles being implemented on an information processing apparatus, comprising:

receiving, via a network, first program or playlist information wirelessly from a device external to the information processing apparatus, the first program or playlist information being received including second program or playlist information that is encrypted;

inputting a user manipulation;

displaying, on a display device, a first user interface for a user to select a user profile from among a plurality of user profiles including a first user profile associated with a first character and a second user profile associated with a second character, the plurality of user profiles being associated with program or playlist information and the first user interface including an option for a user to select the first user profile from the plurality of user profiles by selecting the first character;

receiving a selection of the first user profile;

displaying, in response to the selection, a second user interface for a user to select desired program or playlist information to be reproduced from among the first program or playlist information, the second user interface being associated with the first user profile and displaying the first character, the first character associated with a first group of program or playlist information and indicating an identity of the user of the first user profile, the second user interface further displaying thumbnails corresponding to the first group of program or playlist information;

displaying the second character and a second group of thumbnails corresponding to a second group of program or playlist information associated with the second user profile when the second character is selected, receiving, in a case that the first group of program or playlist information and the second group of program or playlist information include one program or playlist information that is the same, a selection to remove the one program or playlist information from the first group of program or playlist information associated with the first user profile;

removing the one program or playlist information from the first group of program or playlist information, wherein, upon the one program or playlist information being removed from the first group of program or playlist information, the one program or playlist information continues to be included in the second group of program or playlist information for the second user profile and the second group of thumbnails continues to display a thumbnail corresponding to the one program or playlist information when the second character is selected;

receiving a selection of desired program or playlist information based on a selection of a thumbnail from the first group of thumbnails, the desired program or playlist information included in the second program or playlist information;

decrypting program or playlist information corresponding to the selected thumbnail;

displaying the decrypted program or playlist information; and outputting an audio.

17. The method of claim 16, wherein any user can delete stored program or playlist information.

18. The method of claim 16, further comprising:

generating a list of program or playlist information based on preferences of a user determined by a user selections of thumbnails from the first or second group of thumbnails.

19. The method of claim 16, further comprising:

generating a list of program or playlist information based on preferences of a user determined by a user selections of thumbnails associated with the first program or playlist information, the list including third program or playlist information;

receiving a selection of the list by the user; and in response to the selection of the list, displaying the thumbnails that correspond to the third program or playlist information and no other thumbnails associated with program or playlist information of other users.

20. The method of claim 16, further comprising:

generating on screen display information, wherein the first program or playlist information includes third program or playlist information such that, upon selection for playback, the third program or playlist information is outputted with the on screen display information for display of the third program or playlist information and the on screen display information.

21. The method of claim 16, further comprising:

wherein the processor is configured to allow the plurality of program or playlist information to playback in an arbitrary playback sequence.

22. An information processing apparatus comprising:

a network interface receiving first program or playlist information wirelessly from a device external to the information processing apparatus, the first program or playlist information being received including second program or playlist information that is encrypted;

a user manipulation input circuitry configured to receive a user manipulation;

a display displaying a first user interface for a user to select a user profile from among a plurality of user profiles including a first user profile associated with a first character and a second user profile associated with a second character, the plurality of user profiles being associated with program or playlist information and the first user interface including an option for a user to select the first user profile from the plurality of user profiles by selecting the first character;

an input interface receiving a selection of the first user profile at a first time and a selection of the second character at a second time, wherein, in response to the selection of the first user profile, the display displays a second user interface for a user to select desired program or playlist information to be reproduced from among the first program or playlist information, the second user interface being associated with the first user profile and displaying the first character, the first character associated with a first group of program or playlist information and indicating an identity of the user which the first user profile is associated with, the second user interface further displaying thumbnails corresponding to the first group of program or playlist information, and wherein, in response to the selection of the second user profile, the display displays the second character and a second group of thumbnails corresponding to a second group of program or playlist information associated with the second user profile when the second character is selected, the first group of program or playlist information and the second group of program or playlist information including one program or playlist information that is the same;

a processor for removing one program or playlist information from the first group of program or playlist information after the input interface receives a selection to remove the one program or playlist information from the first group of program or playlist information associated with the first user profile; and audio output circuitry configured to output an audio, wherein, upon the one program or playlist information being removed from the first group of program or playlist information, the one program or playlist information continues to be included in the second group of program or playlist information for the second user profile and the second group of thumbnails continues to display a thumbnail corresponding to the one program or playlist information when the second character is selected, wherein the processor decrypts second program or playlist information corresponding to a selected thumbnail when the input interface receives a selection of desired program or playlist information based on a selection of a thumbnail from the first group of thumbnails, and wherein the display displays the decrypted program or playlist information.

23. The information processing apparatus of claim 22, further comprising:

an antenna for wirelessly receiving the first program or playlist information.

24. The information processing apparatus of claim 22, wherein any user can delete stored program or playlist information.

25. The information processing apparatus of claim 22, wherein the processor generates a list of program or playlist information based on preferences of a user determined by a user selections of thumbnails from the first or second group of thumbnails.

26. The information processing apparatus of claim 22, wherein the processor generates a list of program or playlist information based on preferences of a user determined by a user selections of thumbnails associated with the first program or playlist information, the list including third and fourth program or playlist information, and, in response to the input interface receiving a selection of the list by the user, the display displays only those thumbnails that correspond to the third and fourth program or playlist information and no other thumbnails associated with program or playlist information of other users.

27. The information processing apparatus of claim 22, further comprising:

wherein the processor is configured to allow the plurality of program or playlist information to playback in an arbitrary playback sequence.

28. The information processing apparatus of claim 22, further comprising:

an on screen display generator generating on screen display information, wherein the first program or playlist information includes third program or playlist information such that, upon selection for playback, the third program or playlist information is outputted with the on screen display information for display of the third program or playlist information and the on screen display information.

\* \* \* \* \*